United States Patent [19]

Wilson

[11] 4,061,129
[45] Dec. 6, 1977

[54] SOLAR FURNACE HEATING SYSTEM

[76] Inventor: Melvin A. Wilson, Rte. 1, Box 514, Stevensville, Md. 21666

[21] Appl. No.: 722,698

[22] Filed: Sept. 13, 1976

[51] Int. Cl.² .............................................. F24J 3/02
[52] U.S. Cl. ................................... 126/270; 126/400; 237/1 A
[58] Field of Search ....................... 126/270, 271, 400; 237/1 A; 165/18; 34/93

[56] References Cited

U.S. PATENT DOCUMENTS

| | | | |
|---|---|---|---|
| 3,946,721 | 3/1976 | Keyes et al. | 126/270 |
| 3,972,316 | 8/1976 | Alkasab | 126/271 |
| 3,981,445 | 9/1976 | Custer | 126/270 |

FOREIGN PATENT DOCUMENTS 2,461,973  7/1975  Germany ............................. 126/271

*Primary Examiner*—Kenneth W. Sprague
*Assistant Examiner*—James C. Yeung
*Attorney, Agent, or Firm*—Lawrence E. Laubscher

[57] ABSTRACT

A solar furnace heating system is disclosed which is characterized by the provision of novel rotary vane-type heat collector elements arranged in a heat collecting chamber beneath the generally vertical transparent wall of a housing. The fluid to be heated is conveyed across the heat collecting chamber in heat-transfer relationship with the rotary heat collector elements, and then to a heat storage chamber contained in the bottom portion of the housing. After the temperature of the fluid in the heat storage chamber reaches a given value, heated fluid from the heat storage chamber may be conveyed, upon demand, to the enclosure to be heated. In one embodiment, the heat collector elements are mounted for free rotation in the housing by the fluid that is conveyed through the heat collecting chamber. In a second embodiment, means are provided for rotatably driving the heat collector elements in synchronism.

14 Claims, 7 Drawing Figures

1

SOLAR FURNACE HEATING SYSTEM

BACKGROUND OF THE INVENTION

Various types of solar furnace heating systems have been disclosed in the patented prior art, as evidenced by the patents to Thompson U.S. Pat. Nos. 2,931,578, Morgan 3,243,117, Schoenfelder 3,863,621, Keyes et al. 3,894,685 and Parker 3,919,998.

It is conventional in the solar furnace art to provide heat collector elements of the flat plate type including a planar metallic plate which is selectively coated to act as a black body solar energy absorber/heat emitter. In an air transfer medium collector, the air travels through the collector chamber in a path parallel to the planar surface. This flat-plate collector has proven to be inefficient because the black body absorber absorbs only about 90% of the solar energy entering the chamber, thereby reflecting some 10% of the solar energy out of the collector since there are no light entrapment qualities. Another inefficiency of the flat-plate solar collector arises from the fact that the air transfer medium passes over and parallel to the flat collector plate so that little air turbulence is created which reduces the amount of heat energy transferred to the air transfer medium.

An improvement over the flat-plate type solar collector is disclosed in the aforementioned Keyes et al. patent wherein a vertical plate collector is provided with extruded aluminum cups on the surface thereof, the cups having walls perpendicular to the base. The vertical plate collector having a plurality of cups on its surface provides a number of improvements over the flat-plate collector. First, increased energy absorption is provided in that as a ray of solar energy enters a collector cup, it is subject to a number of "bounces" off of the surfaces of the cup. With each bounce, some energy is absorbed by the cup in the form of heat. Second, the effective surface area of the collector surface is approximately four times greater than the surface area of the prior flat-plate collector surface for a given solar window. Third, as forced air is passed over the openings of the cups, a Venturi effect causes a turbulent action to draw heat off of the cups for increased heat exchange to the air transfer medium.

Some inefficiencies, however, do arise form the cupped-collector surface of the apparatus of the Keyes et al. patent. The collector cups do not provide energy entrapment qualities. The bouncing of the solar rays does increase energy absorption, but eventually some solar energy is reflected back out of the collector. Also, the insolation strikes the side walls of the cups at acute angles which provide less energy absorption than insolation which strikes the walls at angles approaching 90°. Finally, while some turbulence causing air impingement is created, it is far from ideal. For maximum heat transfer, the air mass should impinge the collector surface directly at right angles but with enough turbulence so as to prevent a build up of a thin, stagnant, insulating air layer.

SUMMARY OF THE INVENTION

The present invention was developed to provide an improved solar furnace heating system which avoids the above and other drawbacks of the known systems.

A primary object of the present invention is to provide an improved solar heating furnace including rotary vane-type heat collector elements arranged in a heat collecting chamber beneath a generally vertical transparent wall of the furnace housing, means being provided for conveying the fluid which is to be heated by the solar energy through the heat collecting chamber and then to a heat storage chamber contained in the bottom of the housing for transmitting heat to heat storage means contained therein. The heated fluid from the heat storage chamber is then conveyed to the enclosure to be heated.

In accordance with another object of the invention, a plurality of vane-type heat collector means are provided the axes of rotation of which are parallel and equally spaced from the generally vertical transparent housing wall. In one embodiment, the heat collector elements are mounted for free rotation by the fluid to be heated which is conveyed through the heat collecting chamber. In this embodiment, the fluid to be heated is normally air. In a second embodiment, drive means are provided for rotating the vane-type heat collecting elements in synchronism. This embodiment is particularly suitable for use when the fluid to be heated by the solar energy is a liquid.

DESCRIPTION OF THE DRAWINGS

Other objects and advantages of the invention will become apparent from a study of the following specification when viewed in the light of the accompanying drawing, in which.

DETAILED DESCRIPTION

Figure 1:
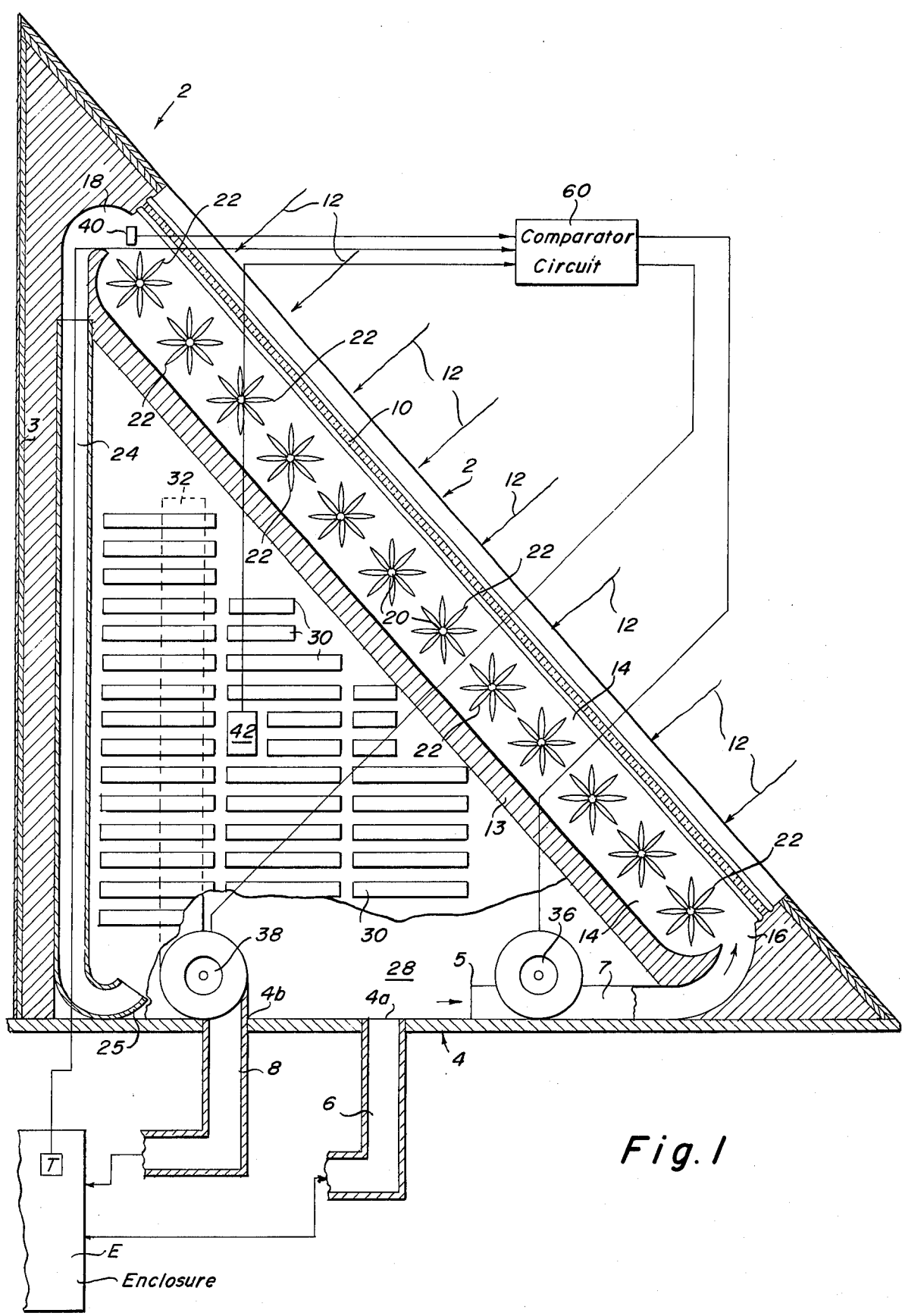
FIG. 1 is a transverse sectional view of the solar furnace heating system of the present invention.

Referring first more particularly to FIG. 1, the solar furnace system of the present invention includes a housing 2 of a generally triangular transverse cross-sectional configuration including rear and bottom walls 3 and 4, respectively, which cooperate with a pair of end walls to partially define a heat storage chamber 28. The bottom wall 4 contains at opposite ends of the storage chamber 28 cold air inlet and hot air outlet openings 4a and 4b, respectively, which are connected with enclosure E via ducts 6 and 8, respectively. The housing also includes at least one inclined generally vertical transparent wall 10 (formed, for example, of insulated glass or transparent synthetic plastic material) for admitting rays 12 from the sun into, and for retaining heat in, a heat collection chamber 14 defined between the transparent wall 10 and an intermediate housing wall 13 parallel with and spaced from the transparent wall 10. The housing contains openings 16 and 18 which communicate with the lower and upper ends of the heat collection chamber 14, thereby to permit a generally vertical flow of air through the chamber 14. Mounted on a plurality of parallel coplanar fixed horizontal shafts 20 within the heat collection chamber 14 are a plurality of freely rotatable vane-type heat collector elements 22 which entrap and absorb solar energy from the solar rays 12 that enter the chamber 14 via transparent wall 10. This array of rotary vane-type heat collector elements provides for an eight-fold increase of effective collector area over conventional prior flat plate collectors. As shown in FIG. 1, the openings 16 and 18 are offset from the common plane containing the shafts 20 which define the axes of rotation of the heat collector elements 22.

Connected at its upper end with the outlet opening 18 of the heat collector chamber 14 is a vertical conduit 24 through which heated air is conveyed downwardly from the top of the heat collection chamber 14 to the bottom portion of the heat storage chamber 28. Mounted in stacked mutually-spaced relation within the heat storage chamber 28 are a plurality of trays 30 which contain conventional heat-retaining material (for example, eutectic salts). A disclosure of suitable heat storage composition is contained in the article "Solar Energy Storage" by Dr. Maria Telkes, ASHRAE Journal, September 1974, pages 38–44. The mutually spaced trays 30 define narrow spaces between all surfaces of the trays, thereby to maximize the amount of surface area of the trays available for a given volume of the heat storage chamber. Deflector means 25 are provided at the bottom of vertical conduit 24 for directing upwardly the heated air which is introduced into the bottom of the storage chamber, which heated air will circulate between the trays and will rise to the top of storage chamber 28.

First blower means 36 having an inlet 5 arranged adjacent the bottom wall 4 are provided for establishing a first flow path of air from storage chamber 28, inlet 5, conduit 7, chamber inlet opening 16, upwardly through the heat collection chamber 14, outwardly through chamber outlet opening 18, and downwardly through conduit 24, whereupon the air is then deflected upwardly into the storage chamber 28 by deflector 25. Second blower means 38 are provided for withdrawing air from the top of storage chamber 28 via vertical conduit 32 and for supplying the heated air to the enclosure E via outlet opening 4b and conduit 8.

Comparator circuit means 60 are provided having first and second inputs connected with temperature sensor means 40 and 42 arranged in the upper portion of heat collection chamber 14 and the central portion of the heat storage chamber 28, respectively. The comparator circuit means also includes a third input terminal which is connected with a room thermostat 39 arranged in the enclosure E. The comparator circuit 60 also includes first and second output terminals connected with the first and second blower means 36 and 38, respectively. The comparator circuit, which is of conventional design known in the art, is operable to energize the first blower means 36 when the temperature of the heat collection chamber 14 exceeds that of the heat storage chamber by a predetermined amount, and to energize the second blower means 38 when the temperature of the heat storage chamber 28 exceeds that of the enclosure E by a predetermined amount and the enclosure thermostat setting exceeds the temperature of enclosure E.

Figure 2:
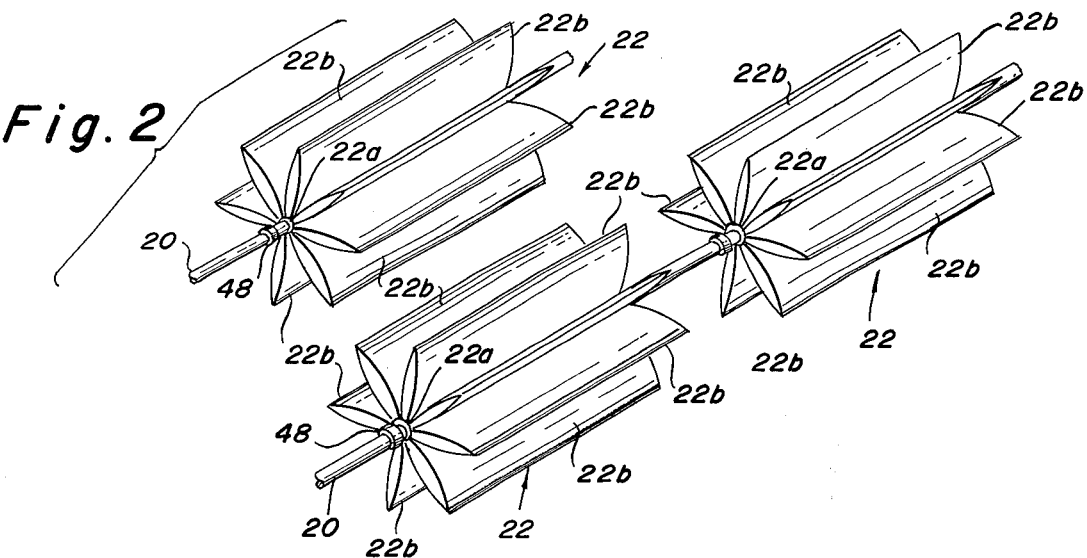
FIG. 2 is a perspective view of a first embodiment of the invention including freely rotatable heat collector elements.
Figure 6:
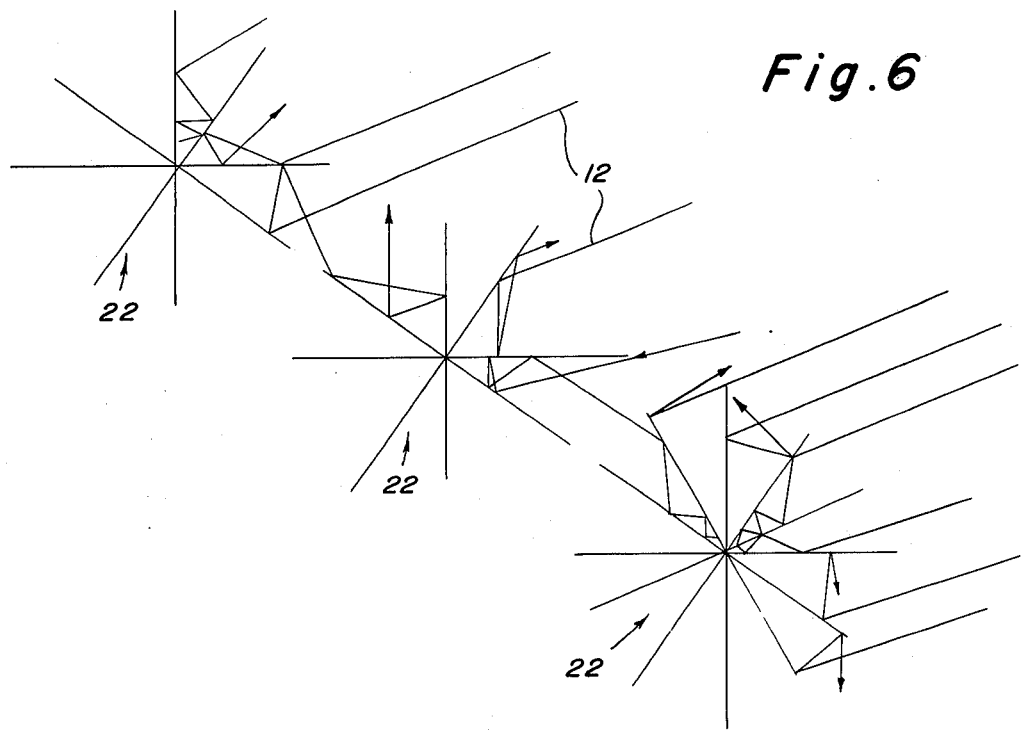
FIG. 6 is an illustration of the solar rays striking the heat collector elements.

Referring now to FIG. 2, the heat collector elements 22 are mounted for free rotation on their longitudinally extending fixed shafts 20, respectively. Each of the collector elements includes a hub portion 22a the inner diameter of which is slightly greater than the corresponding diameter of the shaft associated therewith, thereby to permit free rotation of the collector element. If desired, low-friction synthetic plastic bearing means may be provided on the hub portions 22a. Fixed washers 48 prevent axial displacement of each collector element along its shaft. Extending radially from the hub portions 22a of the heat collector elements 22 are a plurality of radial vane portions 22b. The vane portions are preferably constructed of a lightweight metal (such as aluminum), but other suitable metallic or non-metallic heat transfer material may be used. Preferably the vanes are coated or electroplated to achieve a spectrally selective black coating which absorbs a maximum amount of solar energy from the incoming solar rays striking the surfaces of the vanes. As shown in FIG. 6, the vanes are arranged in such a geometric relationship that, of the 10% of reflected light that might otherwise be lost, a large portion of the insolation is entrapped and absorbed. The term "insolation" refers to the total summation of solar radiation (direct and diffused/reflected radiation) striking the heat exchanger element.

Figure 4:
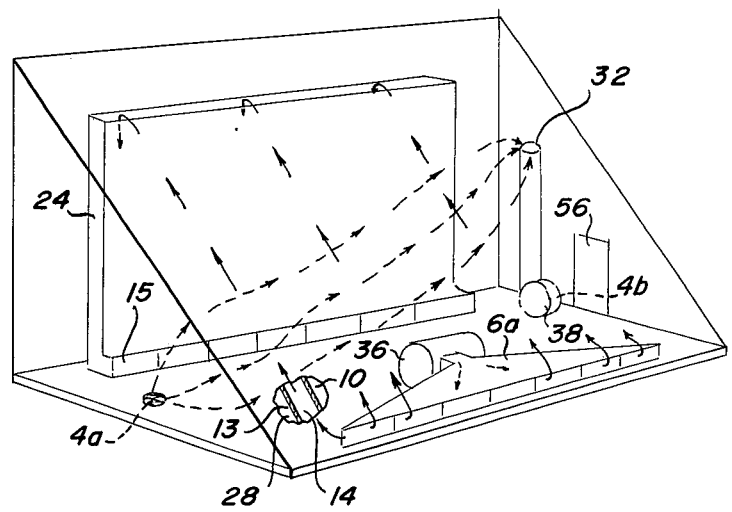
FIG. 4 is a diagrammatic perspective view illustrating the heat collection and heat distribution paths of the heat transfer fluid through the solar furnace.

As shown in FIG. 4, two independently operable distinct circulation patterns are established within the solar furnace housing. The solid arrows illustrate the direction of air flow in the heat collection circulation circuit, and the broken arrows illustrate the direction of air flow in the heat distribution circulation circuit. More particularly, the first blower means 36 (FIG. 1) is operable to initiate the heat collection circulation, whereby relatively cool air from the bottom portion of the heat storage chamber is introduced into the collection chamber 14 via inlet 5, duct 7 and collection chamber inlet 16, whereby the air flows across the freely rotatable heat collector elements 22. Owing to the offset arrangement of the inlet and outlet openings 16 and 18 relative to the axes of rotation of the heat collector elements 22, these elements are caused to rotate by the flow of air conveyed through heat collector chamber 14, thereby improving the heat transfer operation. As previously described the heated air is conveyed to the heat storage area via conduit 24, thus completing the heat collection path.

Heat distribution circulation is initiated by second blower means 38 which draws hot air from the top of the heat storage chamber 28 via duct 32 and supplies the same to the enclosure E via outlet 4b and hot air duct 8. As the hot air is drawn from the top of the heat storage chamber 28 by the blower 38, cool air is drawn into the chamber 28 through the housing inlet 6 from the enclosure. The cool air is heated as it passes up and over the eutectic salts which have melting points between 80° – 250° F. Preferably, the eutectic salts in the heat storage chamber have a melting point between 100° – 130° F so that the cool air is heated to this temperature as it flows upwardly through the chamber to be drawn off at the top by the blower means 38.

OPERATION

When the temperature in the collector chamber equals or exceeds by a predetermined amount the temperature in the heat storage chamber as determined by the two temperature probes 40, 42, the blower 36 is actuated by the comparator circuit 60 to direct the air flow through the solar furnace housing. More particularly, air is drawn from the bottom of storage chamber 28, through the passage 7 and heat collection chamber inlet 16, and upwardly through the heat collection chamber 14. The heated air then flows out through the outlet 18, downwardly through the vertical conduit 24, and is deflected upwardly by the deflector 25, whereupon the heated air rises to heat the eutectic salts contained in the trays 30.

In the first embodiment of FIG. 2, the air flow directed upon the rotatable heat collector elements causes them to rotate in a random fashion, thereby exposing a heat collector surface area eight times greater than that of a planar collector to the incoming solar rays. The solar rays strike the vane portions of the heat collector elements and are entrapped within the configuration of the vane portions. Heat energy is produced with each bounce of the solar rays against the vane surfaces. The heat energy is thereby transferred to the air-filled transfer medium and passes out of the collector chamber with the air flow. Rapid removal of the heat energy from the collector chamber increases the efficiency of the collector surface. The flow rate of the air flow through the chamber is thus regulated by the blower 36 to maintain a temperature within the collector chamber close to 100° F. This temperature is highly compatible with the preferred heat storage medium eutectic salts which can be prepared to have a melting point of 100° F. The heated air passes from the collector chamber down through the rear duct 24 into the bottom portion of the heat storage chamber. Any heat energy entering the heat storage chamber above 100° F. is absorbed by the eutectic salts in the form of heat of fusion. Storage of the heat at a relatively low temperature reduces the potential for heat loss from the storage area through the housing walls for a given amount of insulation as compared to high temperature storage.

Energy in the form of heat continues to accumulate in the heat storage chamber until there is a requirement to heat the enclosure as determined by thermostat 39, whereupon the second blower means 38 is activated. In order to effect heat distribution to the enclosure, two conditions must be met. First, relative to the enclosure temperature there must be some solar heat available (i.e., the heat storage chamber temperature must exceed the enclosure temperature by a predetermined value). Secondly, the enclosure thermostat setting must also exceed the enclosure temperature by some predetermined amount. When these two conditions are met, the comparator circuit effects energization of distribution blower 38 which distributes hot air from the heat storage chamber to the enclosure via duct 8 and returns relatively cool air from enclosure via duct 6.

As shown in FIG. 4, the two distinct air paths contain prime movers that operate independently of each other to cause the air paths to cross or intermingle within the heat storage chamber. Generally the collection path and the heat storage path are vertical, and consequently the paths do not oppose each other and can operate concurrently within the common area. Thus, on a cold overcast day when blower 36 is disabled due to the collector chamber temperature being lower than heat storage temperature, blower 38 may be caused to operate intermittently to heat the enclosure E, provided that the enclosure temperature falls below the demand temperature (thermostat setting) and provided that the heat storage temperature exceeds enclosure temperature. If the sun were now to appear, the heat collector chamber temperature would soon exceed heat storage temperature, thereby reactivating blower 36. Quite possibly this might occur while blower 38 is being operated to heat the enclosure, thereby effecting the aforementioned co-mingling of the two flow paths. Blower 36 will then operate continuously (for about 6 hours) while blower 38 will operate intermittently (as dictated by the aforementioned two conditions) to maintain a comfortable enclosure temperature.

Figure 3:
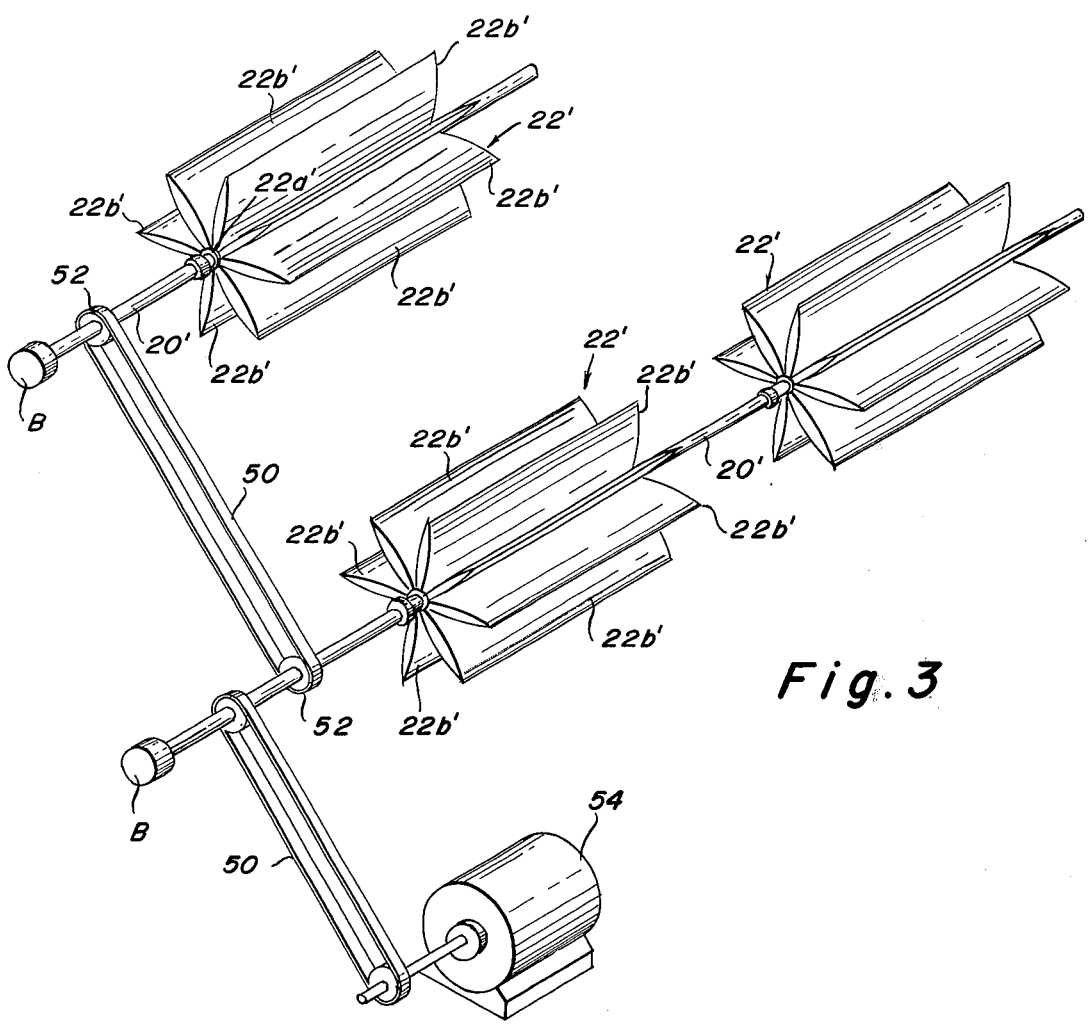
FIG. 3 is a perspective view of a second embodiment of the invention including rotatably driven heat collector elements.

FIG. 3 illustrates a second embodiment of the invention wherein the hub portions 22a of the rotatable heat collector elements are rigidly secured to the longitudinal parallel shafts 20' which in turn are journaled in the housing by fixed bearings B. In this embodiment, the shafts are driven by endless belts 50, pulleys 52 and motor means 54, whereby all of the heat collector elements rotate in synchronism to produce a relatively low flow rate of fluid through the collector chamber 14. The motor 54 may be operated simultaneously with the blower means 36. This embodiment is particularly suitable for use in a system where a liquid (such as water) is used in place of air as the heat exchange medium.

Figure 5:
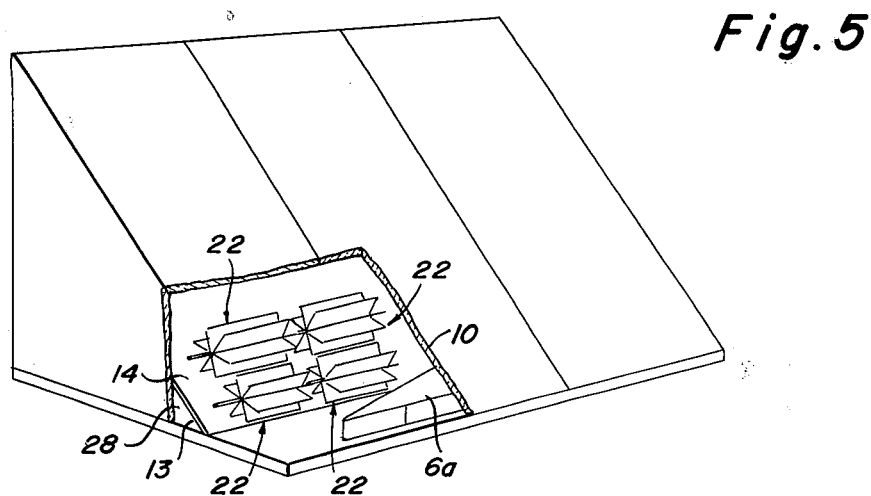
FIG. 5 is a partially cut-away perspective view illustrating the arrangement of the rotatable heat collector elements in vertical rows in the solar furnace housing.

FIG. 5 illustrates the arrangement of the rotatable heat collector elements in a plurality of parallel vertical rows parallel with the transparent housing wall 10. The access door 56 is provided in the side wall of the solar furnace housing to allow access to the interior of the furnace structure and to the heat storage area.

Figure 7:
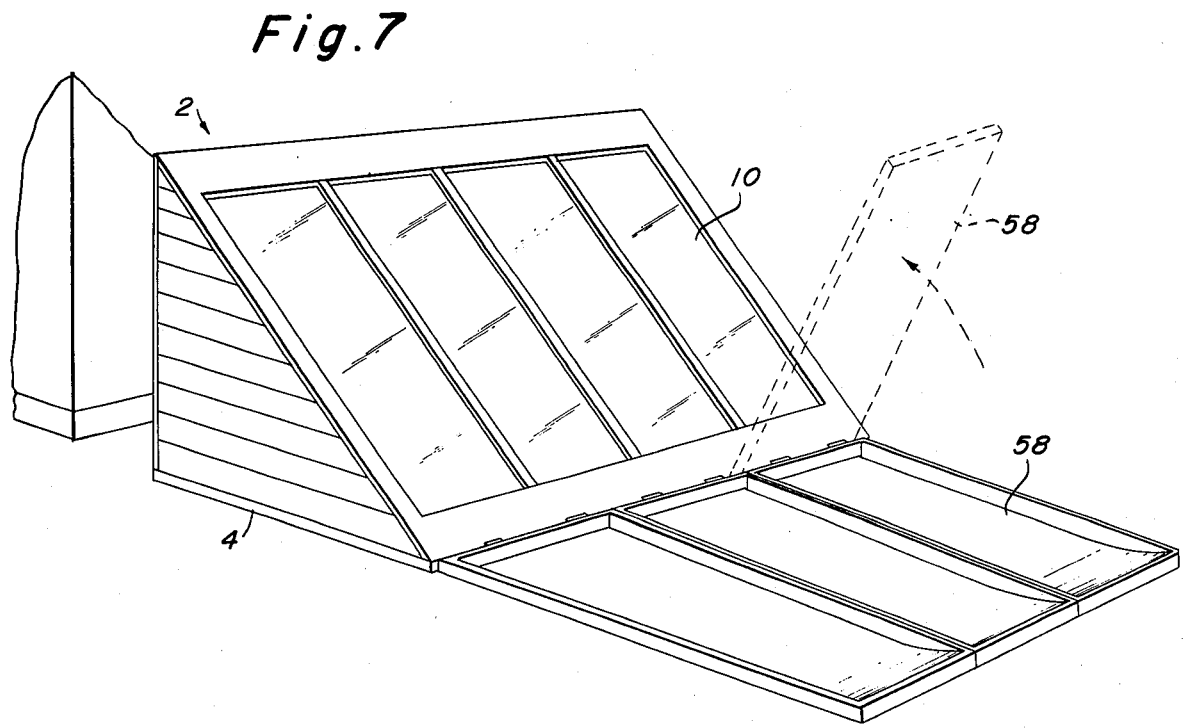
FIG. 7 is a perspective view of the solar furnace housing.

FIG. 7 illustrates the free-standing solar furnace housing. Protective reflecting panels 58 are pivotally connected with the base of the solar furnace. During inclement weather or when the solar furnace is not in use, the protective reflective panels 58 are pivoted upward and secured to cover the inclined generally vertical transparent wall 10. When panels 58 are lowered to a position of about 15° above the horizontal the reflective material on the inside of the panels reflects additional solar radiation into the heat collection chamber, thus acting as an amplifier.

While the accordance with the provisions of the Patent Statutes, the preferred forms and embodiments of the invention have been illustrated and described, it will be apparent to those skilled in the art that various changes and modifications may be made without deviating from the inventive concepts set forth above.

What is claimed is:

1. In a forced fluid solar furnace heating system including a housing having a bottom wall and at least one inclined transparent vertical wall adapted to face the sun, heat collector means arranged within said housing beneath and adjacent said vertical wall for receiving the solar energy transmitted through said transparent vertical housing wall, heat storage means contained in said housing adjacent said bottom wall, and means for directing a flow of heat transfer fluid successively across said heat collector means and through said heat storage means, said housing also containing an inlet opening for supplying a medium to be heated to the heat storage means, and an outlet opening for withdrawing heated air from the heat storage means;

the improvement wherein said heat collector means comprises
 a. at least one rotatable heat collector element including
  1. a generally cylindrical hub portion; and
  2. a plurality of generally planar vane portions extending radially outwardly from said hub portion; and
 b. means connecting heat collector element with said housing for rotation about the longitudinal axis of said hub portion, the axis of rotation of said heat collector element being parallel with and spaced from said transparent vertical wall.

2. Apparatus as defined in claim 1, wherein a plurality of said rotatable heat collector elements are provided the axes of rotation of which are parallel with each other and with said transparent vertical wall.

3. Apparatus as defined in claim 2, wherein the axes of rotation of said heat collector elements are equally spaced from said transparent vertical wall.

4. Apparatus as defined in claim 3, wherein said heat collector elements are arranged in a plurality of generally vertical parallel rows, the axes of rotation of said heat collector elements being horizontal and contained in a common inclined plane parallel with said transparent wall.

5. A forced fluid solar heating system, comprising
   a. housing (2) including a bottom wall (4), a generally vertical transparent wall (10) adapted to face the sun, means (13) defining a heat collection chamber (14) adjacent said transparent wall, means defining a heat storage chamber (28) adjacent said bottom wall, inlet passage means (6) for supplying fluid from an enclosure to the bottom portion of said heat storage chamber, outlet passage means (32, 8) for supplying fluid from the top of said heat storage chamber to said enclosure, first conduit means (7) for supplying fluid from the bottom of said heat storage chamber to the bottom of said heat collection chamber and second conduit means (24) for supplying fluid from the top of said heat collection chamber to the bottom of said heat storage chamber;
   b. heat collector means (22, 22') arranged in said heat collection chamber, said heat collector means including at least one heat collector element rotatably mounted in said heat collection chamber for rotation about an axis parallel with said transparent housing wall, said heat collector element including a hub portion (22a, 22a'), and a plurlity of vane portions (22b, 22b') extending radially outwardly from said hub portion;
   c. heat storage means (30) arranged in said heat storage chamber;
   d. first means (36) for initially conveying fluid from the bottom of said heat storage chamber to the bottom of said heat collection chamber via said first conduit means, and for conveying fluid from the top of said heat collection chamber to the bottom of said heat storage chamber via said second conduit means; and
   e. second means (38) for conveying fluid from the top of said heat storage chamber to said enclosure via said outlet passage means.

6. Apparatus as defined in claim 5, wherein said conveying means includes a first blower connected in one of said first and second conduit means.

7. Apparatus as defined in claim 6, wherein said second conveying means includes a second blower connected in one of said inlet and outlet passage means.

8. Apparatus as defined in claim 5, wherein said heat collector means includes a plurality of rotatable vane-type heat collector elements rotatable about parallel horizontal axes contained in a plane parallel with the transparent housing wall.

9. Apparatus as defined in claim 5, and further including deflector means (25) connected with the outlet end of said second conduit means for deflecting upwardly the fluid discharged from said second conduit means.

10. In a forced fluid solar furnace heating system including a housing having a bottom wall and at least one inclined transparent vertical wall adapted to face the sun, heat collector means arranged within said housing beneath and adjacent said vertical wall for receiving the solar energy transmitted through said transparent vertical housing wall, heat storage means contained in said housing adjacent said bottom wall, and means for directing a flow of heat transfer fluid successively across said heat collector means and through said heat storage means, said housing also containing an inlet opening for supplying a medium to be heated to the heat storage means, and an outlet opening for withdrawing heated air from the heat storage means;
the improvement wherein said heat collector means comprises
   a. at least one rotatable heat collector element including
      1. a tubular central hub portion, and
      2. a plurality of generally planar vane portions extending radially outwardly from said hub portion; and
   b. means connecting said heat collector element for rotation about an axis parallel with and spaced from said transparent vertical wall, said connecting means including a shaft connected at opposite ends with said housing, said hub portion being journalled on said shaft to permit free rotation of said heat collector element by the flow of fluid across said heat collector means.

11. In a forced fluid solar furnace heating system including a housing having a bottom wall and at least one inclined transparent vertical wall adapted to face the sun, heat collector means arranged within said housing beneath and adjacent said vertical wall for receiving the solar energy transmitted through said transparent vertical housing wall, heat storage means contained in said housing adjacent said bottom wall, and means for directing a flow of heat transfer fluid successively across said heat collector means and through said heat storage means, said housing also containing an inlet opening for supplying a medium to be heated to the heat storage means, and an outlet opening for withdrawing heated air from the heat storage means;
the improvement wherein said heat collector means comprises
   a. a plurality of rotatable heat collector elements each including
      1. a tubular hub portion, and
      2. a plurality of generally vane portions extending radially outwardly from said hub portion;
   b. means connecting said heat collector elements with said housing for rotation about parallel axes parallel with said transparent wall, said connecting means including a plurality of support shafts rotatably connected with said housing and upon which said hub portions are concentrically mounted; and
   c. means for rotatably driving said shafts in synchronism.

12. A forced fluid solar heating system, comprising
   a. a housing (2) including a bottom wall (4), an inclined generally vertical transparent wall (10) adapted to face the sun, means (13) defining a heat collection chamber (14) adjacent said transparent wall, means defining a heat storage chamber (28) adjacent said bottom wall, inlet passage means (6) for supplying fluid from an enclosure to the bottom portion of said heat storage chamber, outlet passage means (32, 8) for supplying fluid from the top of said heat storage chamber to said enclosure, first conduit means (7) for supplying fluid from the bottom of said heat storage chamber to the bottom of said heat collection chamber and second conduit means (24) for supplying fluid from the top of said heat collection chamber to the bottom of said heat storage chamber;

b. heat collector means (22, 22') arranged in said heat collection chamber, said heat collector means including a plurality of heat collector elements rotatably mounted in said heat collection chamber for free rotation about parallel horizontal axes contained in a plane parallel with said transparent housing wall, each of said heat collector elements including a hub portion (22a, 22a'), and a plurality of vane portions (22b, 22b') extending radially outwardly from said hub portion, the inlet and outlet openings of said heat collection chamber being offset from the plane containing the axes of rotation of said heat collector elements, whereby the flow of the fluid to be heated through said heat collection chamber effects rotation of the heat collector elements;

c. heat storage means (30) arranged in said heat storage chamber;

d. first means (36) for initially conveying fluid from the bottom of said heat storage chamber to the bottom of said heat collection chamber via said first conduit means, and for conveying fluid from the top of said heat collection chamber to the bottom of said heat storage chamber via said second conduit means; and e. second means (38) for conveying fluid from the top of said heat storage chamber to said enclosure via said outlet passage means.

13. A forced fluid solar heating system, comprising a. a housing (2) including a bottom wall (4), an inclined generally vertical transparent wall (10) adapted to face the sun, means (13) defining a heat collection chamber (14) adjacent said transparent wall, means defining a heat storage chamber (28) adjacent said bottom wall, inlet passage means (6) for supplying fluid from an enclosure to the bottom portion of said heat storage chamber, outlet passage means (32, 8) for supplying fluid from the top of said heat storage chamber to said enclosure, first conduit means (7) for supplying fluid from the bottom of said heat storage chamber to the bottom of said heat collection chamber and second conduit means (24) for supplying fluid from the top of said heat collection chamber to the bottom of said heat storage chamber;

b. heat collector means (22, 22') arranged in said heat collection chamber, said heat collector means including a plurality of heat collector elements rotatably mounted in said heat collection chamber for rotation about parallel horizontal axes contained in a plane parallel with said transparent housing wall, each of said heat collector elements including a hub portion (22a, 22a'), and a plurality of vane portions (22b, 22b') extending radially outwardly from said hub portion;

c. drive means for driving said heat collector elements in synchronism;

d. heat storage means (30) arranged in said heat storage chamber;

e. first means (36) for initially conveying fluid from the bottom of said heat storage chamber to the bottom of said heat collection chamber via said first conduit means, and for conveying fluid from the top of said heat collection chamber to the bottom of said heat storage chamber via said second conduit means; and f. second means (38) for conveying fluid from the top of said heat storage chamber to said enclosure via said outlet passage means.

14. Apparatus as defined in claim 13, wherein said heat collector elements are arranged in longitudinally spaced generally vertical rows.

* * * * *